Patented Apr. 7, 1936

2,036,380

UNITED STATES PATENT OFFICE 2,036,380

ADSORBENT CARBON

Charles G. Wortz, Wilmington, Del., assignor to E. I. du Pont de Nemours & Company, Wilmington, Del., a corporation of Delaware No Drawing. Application December 14, 1934, Serial No. 757,556

18 Claims. (Cl. 252—3)

This invention relates to improved ash-free carbons. More particularly it relates to ash-free activated carbon and methods for producing same.

It has long been known that sugar can be dehydrated by treatment with mineral acids to substances of higher carbon content. Existing processes usually yield finely divided products which are worthless as gas adsorption media. A process for producing a compact carbon by dehydration of carbohydrates with sulfuric acid is described in German Patent No. 487,026. However, definite temperatures, concentrations, etc., are not specified and the product appears to have a low activity. So far as we are aware the processes of the present invention have never before been described or practiced for the production of ash-free activated carbons.

An object of this invention is the production of ash-free carbon. A further object is the production of ash-free activated carbon and a still further object is to produce a carbon of the type which is satisfatory for gas adsorption. Further objects will appear hereinafter.

These objects are accomplished by the following invention which may be described in a general way as follows:

A solution of sucrose and hydrochloric acid is maintained at a moderate temperature until a carbonaceous gel is formed. The resulting gel is heated to form a hard carbon mass which is then ignited to decompose the residual organic compounds. The ash-free carbon produced in this manner may be steam-activated to form an active carbon.

It is to be understood that the term "ash-free" as applied to compositions in this specification means that the ash content is less than 0.05 per cent.

The following examples describe in detail preferred embodiments of the invention and are presented as illustrations and not as limitations.

Example I

A solution is prepared by heating 70 parts by weight of cane sugar (sucrose) and 30 parts of C. P. concentrated hydrochloric acid at 60° C. The solution is cooled and poured into a Pyrex tray to a depth of one inch. A temperature of 35° C. is maintained for about three days at which time the liquid has become a firm jelly which may be cut cleanly. The layer of gel is then cut in place into one inch squares to facilitate the escape of carbon dioxide which begins to form at this stage, and is heated for an additional eight days at 35° C. The cubes of hardened gel are now transferred to a balloon flask, equipped with a reflux condenser, and an amount of 20 per cent hydrochloric acid is added thereto equal to 10 per cent of the weight of the gel. The temperature is gradually raised to 105° C. over a period of three days. The hard carbon masses resulting from this treatment are washed with water to free them from acid, dried, and ignited by gradually raising the temperature to 650° C. After crushing the carbon to 6–18 mesh it is activated in steam at 830° C. A rugged ash-free carbon with excellent gas adsorption characteristics is obtained. The yield is approximately 25 per cent of theory.

Example II

An ash-free carbon is prepared according to the procedure of Example I, except for the initial gelation. A temperature of 25° C. is maintained in this first step, thereby increasing the time from three days to five days. The lower temperature reduces the evolution of carbon dioxide and consequently lessens the disruption of the carbonaceous mass. Accordingly, a more sturdy final product is obtained than in Example I and the yield is slightly greater.

Example III

The procedure of Example I is followed through the heat treatment at 105° C. The carbon masses from this treatment are subjected to a steam distillation in which the temperature is gradually raised to 650° C. Hydrochloric acid and various organic compounds may be recovered from the aqueous distillate. The carbon from the steam distillation has an appreciable gas adsorption value and may be used without further treatment. However, a carbon of greater activity is obtained by steam activation at 830° C. as in Example I.

Example IV

A mixture of 140 g. of cane sugar (sucrose) and 60 g. of C. P. concentrated hydrochloric acid in a 600 cc. Pyrex beaker is heated at about 60° C. with constant stirring until all the sugar has dissolved. The temperature is then increased to 90° to 100° C. whereupon the liquid froths vigorously and the heat of reaction causes the temperature to rise to about 120° C. The frothing is largely due to the evolution of carbon dioxide. The stiff, bubble-filled mass (several times the volume of the original solution) is hardened by heating for 24 hours in the presence of hydrochloric acid fumes. The mass is then broken up, washed free of hydrochloric acid, dried, and ignited by gradually raising the temperature to 650° C. The flaky carbon which results is activated by heating in a current of steam at 850° C. and is suitable for use as a catalyst in reactions where fine particle size is permissible.

Example V

A mixture of 70 parts by weight of cane sugar (sucrose) and 30 parts of C. P. concentrated hydrochloric acid is heated at 60° C. to effect solution and then, after cooling to about 25° C., is transferred to a Carius tube. Allowing a free space equal to about one-half the volume of the sugar solution, the Carius tube is sealed, and together with some water is placed in a steel tube capable of withstanding high pressure. The steel container is sealed and heated in a furnace for about 6 hours at 90° C. The hard compact carbon mass recovered is heated for 24 hours in the presence of hydrochloric acid, and after breaking into one-half inch pieces is washed, dried, and ignited at a temperature gradually increased to 650° C. The carbon lumps are crushed to 6-18 mesh size and activated at 830° C. with steam. An ash-free carbon results that has excellent gas adsorption capacity and high mechanical strength.

Example VI

The above mentioned procedures were varied by carrying out the gelation of the sugar under 1,000 pounds per square inch carbon dioxide pressure in an autoclave, whereby a product was obtained similar to that formed in the Carius tube.

It is important that the pure form of sucrose be used in the above examples in order to obtain an ash-free product. Molasses, for example, is an unsatisfactory form due to its high ash content.

In the foregoing examples the preferred ratio of sugar to acid has been employed, namely, 70 parts by weight of sugar to 30 parts by weight of acid. Operable limits are found with higher ratios of sugar, for example, 90 parts by weight of sugar to 10 parts by weight of acid. Ratios containing a higher percentage of acid may be used than that preferred such as, for example, a ratio of 50 parts by weight of sugar to 50 parts by weight of acid. In the first case stated, that is, the use of a higher ratio of sugar, the reaction is slowed down to a great extent. While percentages of acid higher than 30% may be used, as stated above, the excess acid is not necessary and thus the process becomes uneconomical.

Concentrated acid is employed in the examples and is preferred. Dilute acid, though operable, yields an inferior product.

For the formation of a rugged granular carbon of the type produced in Example I, it is necessary that the solution of hydrochloric acid and sucrose stand in a static condition at room temperature for several days until a firm carbonaceous gel forms. The solution should be in a relatively thin layer, preferably about 1 inch thick and not over about 4 inches thick, if it is to be allowed to stand at room temperature without cooling means other than natural radiation. For larger volumes of solution, that is, volumes of such depth that the heat of reaction will accumulate and increase the temperature of the mixture, it is necessary that the solution be adequately cooled so that the temperature throughout it will not exceed approximately 40° C. Heating speeds up the gel formation and causes the dehydration reaction to proceed too violently with the evolution of relatively large volumes of carbon dioxide and the formation of a frothy material. The use of the thin layers is preferred as they permit the evolution of the carbon dioxide with less mechanical disruptions of the mass. The sugar-acid solution should not be stirred or agitated during the gel formation period as such stirring or agitation produces a powdery carbon.

If it is desired to obtain a product of the type disclosed by Example IV, the gel formation may be speeded up by causing the heating of the solution either by external means or by the accumulation of the heat of reaction.

It was also found that washing and drying the slowly formed gel without further treatment resulted in serious loss of material and did not yield a product that could be readily converted into an active carbon. However, if the gel formed at low temperature is further hardened by heating in hydrochloric acid while gradually raising the temperature to the boiling point of the acid, a hard carbon mass is obtained which can be washed, ignited to decompose the residual organic compounds, and activated without excessive loss of material.

When operating the process of the invention at atmospheric pressure in the production of a rugged granular carbon, the upper limit of temperature during the initial gelation is 40° C. and the preferred temperature range is from 25° to 35° C. Lower temperatures slow down the reaction to an extent which makes them impractical. The processing time may be reduced by several days by carrying out gelation at an initially elevated temperature and under a pressure sufficient to prevent disruption of the mass due to gas evolution. It has not been found possible to effect a 100% dehydration of sugar by the hydrochloric acid treatment alone. Therefore, the hard carbon mass formed must be ignited to a temperature sufficient to split off residual hydrogen and oxygen still attached to the carbon structure. This ignition also serves to expel or decompose low molecular weight side reaction products such as levulinic acid.

In order to avoid ash in the final product it is important that the containing vessels be made of material that will be unattacked by the acid used. Pyrex glass has been found to be satisfactory and in addition certain types of porcelain may be used.

Optimum activation of the carbons with steam is obtained at temperatures in the neighborhood of 830° C., although temperatures as low as 650° are operable as indicated in the examples.

An advantage of my invention resides in the availability of the raw materials used. In addition, the freedom from ash of my product is an important advantage as even small amounts of ash material may affect the activity of carbon catalysts adversely. The active carbons of my invention may find use as gas adsorbents, as for solvent recovery, or as catalyst supports in such cases as demand an active surface free from contaminating influences.

As many apparently widely different embodiments of this invention may be made without departing from the spirit and scope thereof, it is to be understood that I do not limit myself to the specific embodiments thereof except as defined in the appended patent claims.

I claim:

1. A process for the production of ash-free carbon which comprises maintaining a solution comprising essentially sucrose in concentrated hydrochloric acid at a moderate temperature less than 100° C. to form a hard carbon mass and then igniting the hard carbon mass to decompose the residual organic compounds.

2. The process according to claim 1 characterized in that the hard carbon mass, after ignition, is activated.

3. The process according to claim 1 characterized in that the heating step is carried out under superatmospheric pressure.

4. A process for the production of ash-free carbon which comprises heating a solution of sucrose in concentrated hydrochloric acid at a temperature of about 90° C. and under superatmospheric pressure so as to form a hard compact carbon mass, igniting the hard carbon mass to decompose the residual organic compounds, and then activating the resulting carbon.

5. A process for the production of ash-free carbon which comprises permitting a solution of sucrose in concentrated hydrochloric acid to stand at a temperature between room temperature and 40° C. for a sufficient period of time to form a jelly, heating the jelly with a gradual rise in temperature to first harden same and then form a hard carbon mass, and igniting the hard carbon mass to decompose the residual organic compounds.

6. The process according to claim 5 characterized in that the solution of sucrose in hydrochloric acid is permitted to stand in a shallow layer about 1 inch thick.

7. The process according to claim 5 characterized in that the solution of sucrose in hydrochloric acid is kept in a static condition during the period of gel formation.

8. The process according to claim 5 characterized in that the solution of sucrose in hydrochloric acid is made up of from 5 to 9 parts by weight of sucrose added to 1 to 5 parts by weight of concentrated hydrochloric acid.

9. The process according to claim 5 characterized in that the solution of sucrose in hydrochloric acid is made up of about 7 parts by weight of sucrose added to about 3 parts by weight of concentrated hydrochloric acid.

10. The process according to claim 5 characterized in that the jelly is cut into small pieces prior to the heating step.

11. A process for the production of ash-free carbon which comprises permitting a solution of sucrose in concentrated hydrochloric acid to stand at room temperature for a sufficient period of time to form a jelly, heating the jelly at about 35° C. so as to harden same, heating the hardened jelly under reflux conditions with a solution of about 20% hydrochloric acid while gradually raising the temperature to the boiling point of the acid so as to form a hard carbon mass, and igniting the hard carbon mass to decompose the residual organic compounds.

12. A process for the production of ash-free carbon which comprises heating a solution of sucrose in concentrated hydrochloric acid with a gradual rise in temperature to about 40° C. so as to first produce a jelly and then to harden same, heating the hardened jelly while in contact with hydrochloric acid to produce a hard carbon mass, and igniting the carbon mass to decompose the residual organic compounds.

13. A process for the production of ash-free carbon which comprises permitting a solution of sucrose in concentrated hydrochloric acid to stand in a static condition and in a layer not greater than 4 inches thick at a temperature of about 25° C. for a sufficient period of time to form a jelly, heating the jelly at about 35° for a sufficient period of time to harden same, heating the hardened jelly under reflux conditions with a solution of about 20% hydrochloric acid while gradually raising the temperature to the boiling point of the acid so as to form a hard carbon mass, igniting the hard carbon mass to decompose the residual organic compounds, and then activating the resulting carbon.

14. A process for the production of ash-free carbon which comprises permitting a solution of sucrose in concentrated hydrochloric acid to stand at room temperature for a sufficient period of time to form a jelly, cutting the jelly into small pieces about the size of one-inch cubes, then heating the jelly at about 35° C. so as to harden same, heating the hardened jelly under reflux conditions with a solution of about 20% hydrochloric acid while gradually raising the temperature to the boiling point of the acid so as to form a hard carbon mass, and igniting the hard carbon mass to decompose the residual organic compounds.

15. The process according to claim 11 characterized in that the solution of sucrose in hydrochloric acid is made up of about 7 parts of sucrose added to about 3 parts by weight of concentrated hydrochloric acid.

16. The process according to claim 14 characterized in that the solution of sucrose in hydrochloric acid is made up of about 7 parts of sucrose added to about 3 parts by weight of concentrated hydrochloric acid.

17. The process according to claim 13 characterized in that the jelly is cut into small pieces about the size of one-inch cubes prior to heating said jelly so as to harden same.

18. A process for the production of ash-free carbon, which comprises heating a solution of sucrose in concentrated hydrochloric acid at a temperature of about 90° to 100° C. until a stiff bubble-filled mass is obtained, further heating said mass in the presence of hydrochloric acid fumes for sufficient length of time to form a hard carbon mass, and igniting the hard carbon mass to decompose the residual organic compounds.

CHARLES G. WORTZ.